United States Patent
Glickman et al.

(10) Patent No.: US 8,090,678 B1
(45) Date of Patent: Jan. 3, 2012

(54) SYSTEMS AND METHODS FOR EXTRACTING INFORMATION FROM STRUCTURED DOCUMENTS

(75) Inventors: Oren Glickman, Moshav Zofit (IL); Amir Ashkenazi, Rye Brook, NY (US); Ariel Yaar, Moshav Zofit (IL)

(73) Assignee: Shopping.com, Brisbane, CA (US)

( * ) Notice: Subject to any disclaimer, the term of this patent is extended or adjusted under 35 U.S.C. 154(b) by 1440 days.

(21) Appl. No.: 10/626,430

(22) Filed: Jul. 23, 2003

(51) Int. Cl.
G06F 7/00 (2006.01)
G06F 17/30 (2006.01)

(52) U.S. Cl. .......... 707/602; 707/728; 707/813

(58) Field of Classification Search .......... 707/102, 707/602, 728, 813
See application file for complete search history.

(56) References Cited

U.S. PATENT DOCUMENTS

| | | | |
|---|---|---|---|
| 5,778,362 A * | 7/1998 | Deerwester | 707/5 |
| 5,913,214 A | 6/1999 | Madnick et al. | 707/10 |
| 6,119,101 A | 9/2000 | Peckover | |
| 6,185,558 B1 | 2/2001 | Bowman et al. | |
| 6,301,584 B1 | 10/2001 | Ranger | |
| 6,304,854 B1 | 10/2001 | Harris | |
| 6,317,718 B1 | 11/2001 | Fano | |
| 6,339,773 B1 | 1/2002 | Rishe | 707/4 |
| 6,353,840 B2 | 3/2002 | Saito et al. | 707/517 |
| 6,360,227 B1 * | 3/2002 | Aggarwal et al. | 707/102 |
| 6,381,597 B1 | 4/2002 | Lin | |
| 6,411,974 B1 | 6/2002 | Graham et al. | 707/531 |
| 6,446,099 B1 * | 9/2002 | Peairs | 715/210 |
| 6,516,308 B1 | 2/2003 | Cohen | 706/12 |
| 6,519,557 B1 * | 2/2003 | Emens et al. | 704/8 |
| 6,535,880 B1 | 3/2003 | Musgrove et al. | |
| 6,538,673 B1 * | 3/2003 | Maslov | 715/853 |
| 6,725,425 B1 * | 4/2004 | Rajan et al. | 715/513 |
| 6,732,102 B1 * | 5/2004 | Khandekar | 707/10 |
| 7,085,994 B2 * | 8/2006 | Gvily | 715/500.1 |
| 7,137,065 B1 * | 11/2006 | Huang et al. | 715/205 |
| 7,177,818 B2 | 2/2007 | Nair | |
| 2002/0111966 A1 * | 8/2002 | Fukuda et al. | 707/513 |

(Continued)

FOREIGN PATENT DOCUMENTS

WO WO09832289 7/1998

OTHER PUBLICATIONS

Crochemore, Maxime and Rytter, Wojciech, *Text Algorithms* (Oxford University Press 1994).

(Continued)

*Primary Examiner* — Etienne Leroux
*Assistant Examiner* — Jared Bibbee
(74) *Attorney, Agent, or Firm* — Haynes and Boone, LLP

(57) ABSTRACT

Systems and methods for extracting information from structured documents are provided. The systems and methods relate to selecting a centroid document from a group of structured documents, selecting a subset of the group of structured documents in order to form a cluster of the subset of documents about the centroid document. The selecting the subset is preferably based on the relative similarity between each of the selected subset and the centroid document. Then, systems and methods according to the invention include marking a data element on the centroid document. The systems and elements also include identifying a data element on each of the subset of documents, the data element that corresponds to the marked data element on the centroid document. Finally, data may be extracted from the subset of documents based on the identifying step.

27 Claims, 12 Drawing Sheets

U.S. PATENT DOCUMENTS

| | | | |
|---|---|---|---|
| 2002/0129015 A1* | 9/2002 | Caudill et al. | 707/6 |
| 2002/0143659 A1* | 10/2002 | Keezer et al. | 705/27 |
| 2003/0182283 A1* | 9/2003 | Bean et al. | 707/6 |
| 2003/0187834 A1* | 10/2003 | Oda et al. | 707/3 |
| 2007/0022374 A1* | 1/2007 | Huang et al. | 715/513 |

OTHER PUBLICATIONS

Stephen, Graham A., *String Searching Algorithms* (World Scientific 1994).

Gusfield, Dan, *Algorithms on Strings Trees, and Sequences: Computer Science and Computational Biology* (Cambridge University Press 1997).

Dorrenbos et al., "A Scalable Comparison Shopping Agent for the World-Wide Web", Proceedings of the First International Conference on Autonomous Agents, Feb. 1997.

Perkowitz et al., "Learning to Understand Information on the Internet: An Example-Based Approach", Journal of Intelligent Information Systems vol. 8, No. 2, Mar. 1997.

\* cited by examiner

FIG. 9

| url (1110) | Title (1120) | Description (1130) Data extracted | Image (1140) | Price (1150) |
|---|---|---|---|---|
| url | Uniden TRU5885-2 Now In Stock | 4 Hr. Talk Caller ID scroll during call NIMH Batteries included New message waiting indication (H/S LED) Trilingual voice prompts in answering system - English/French/Spanish New Item 5. 8GHz Digital spread spectrum You Get 1 Cordless Base Station W/Handset +1 Cordless Handset/Charger Digital Answering System Handset / Base Speakerphone Caller-ID / Call Waiting caller-ID Handset to handset call transfer Tri-Lingual caller-ID display menus - English/French/Spanish Phone book memory 100 Dynamic CID/Memory locations headset jack 4 Melody ring tones 6 Ring tones Handset status LED Last three number redial Any key answer Batery life - 8 Day Standard | | Price: $239.99 |

FIG. 11

Data extracted

| url | desc | Image | Price | Title |
|-----|------|-------|-------|-------|
| url | 9-ply 304 surgical stainless steel AISI 430 stainless steel encapsulated base Suitable for any cooking surface *roaster cover also fits skillet | | $193.90 | ForeverWare ™ 15pc Cookware Set |
| url | Nonstick cooking surface. Gray-Fleck exterior. Tempered rimmed glass covers. Phenolic stay-cool handles. | | $147.65 | Revere® 10pc Culinary Advantage™ Cookware Set |

SYSTEMS AND METHODS FOR EXTRACTING INFORMATION FROM STRUCTURED DOCUMENTS

BACKGROUND OF THE INVENTION

This invention relates generally to data extraction from structured documents. More particularly, this invention relates to the use of clustering and alignment algorithms in data extraction in order to minimize the need for operator input.

A need exists to pull only data from documents that combine data and presentation elements. Such documents may include Internet documents such as Internet pages. These documents may include the data for data fields described in more detail below and the data may be structured in HTML (HyperText Markup Language), a language that combines the data and the presentation information.

Many Internet pages having data may be included in a single web site. Nevertheless, the Internet pages may have similar, albeit slightly different, structures. The goal of a typical content aggregator is to retrieve, normalize and format the data for later use. The normalization and formatting of the data allows for greater control and presentation of the retrieved data. Such normalization and formatting may include storing the data in a form-field table.

A form-field table relating to storing items for an Internet shopping site may include fields such as name of item, description of item, and price of item. It should be noted that while the examples of this patent application deal primarily with data extraction for a content aggregator related to Internet shopping, the principles described and claimed herein may relate to any suitable content aggregator such as an intelligence system, a search engine etc.

A key element in any data extraction method is the process of identifying the location in source documents of the elements from which to extract the data. Most prior art data extraction systems from heterogeneous—i.e., substantially similarly formatted—structured documents, such as heterogeneous HTML documents, are based on regular expression, PERL (Pattern Extraction Report Language, a program for which it is easier to do pattern matching) or other scripting methods in order to identify those elements. A conventional scripting method may require writing a script. A script is directions how to access the information from a particular document or group of documents. For example, a script may be instructions to extract a particular piece of information by jumping to the fourth cell in the third column of a table on a given page. With respect to such a system, each site, and, in many cases each page, requires a separate script.

Those methods have several drawbacks: The process of defining the script is time consuming and labor intensive. Furthermore, such methods may require experienced personnel to define the scripts. Finally, the scripts are very sensitive to small changes in the source documents and cannot accommodate changes made to pages after the script has been written. Therefore, each introduction of a new page on a website, or alternatively, each introduction of a new structure for an existing page, requires that a new script be written, or at least adapted, to conform to the new page.

It would be desirable to provide systems and methods that extract data from documents in a way that is more efficient than conventional scripting methods.

It would also be desirable if such systems and methods could be adapted to be substantially automated in order to reduce the labor intensive quality of data extraction.

SUMMARY OF THE INVENTION

It is an object of this invention to provide systems and methods that extract data from documents in a way that is more efficient than conventional scripting methods.

It is also an object of this invention to adapt such systems and methods to be substantially automated in order to reduce the labor intensive quality of data extraction.

In accordance with this invention, systems and methods which extract data from documents, and which may be substantially fully automated, are provided. These systems, and/or methods, preferably include the following steps: First, in an embodiment relating to aggregating information for presentation on a comparison shopping site, a particular merchant web site, including multiple Internet pages, may be replicated to a computer associated with the comparison shopping site. Then, the pages may be aligned with one another to determine a respective similarity between the pages. This may be implemented using an appropriate alignment algorithm as is known in the art. The similarity may be expressed in terms of a similarity index, or dissimilarity penalty.

Based on the respective similarity between the pages, the pages are then clustered about a number of centroids, each centroid representing an arbitrarily-selected, or systematically-selected, central document of the cluster. Each cluster member is aligned about its respective centroid to be included in a particular cluster. A pre-determined threshold is used to determine whether the cluster member is sufficiently similar to the centroid. When a group of cluster members is determined to be sufficiently close to a given centroid, the system, or method, then identifies desired data elements in each centroid. Thereafter, in a step that may also be based on the previously used alignment algorithm, the data from the aligned element in each cluster member that corresponds to the identified data element in the centroid is preferably identified, extracted and aggregated in some suitable fashion.

It should be noted that the combination of using the aligning algorithm as the suitable metric for providing the clustering forms a method according to the invention as does the combination of extraction based on the alignment algorithm. Thus, these two distinct combinations should preferably be considered independent inventions in addition to the invention related to utilizing the alignment algorithm, clustering and extracting data.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 9 is an example of a product cluster centroid after tagging;

FIG. 11 is an example of data extracted from a cluster and formatted; and

FIG. 12 is another example of data extracted from a cluster and formatted.

DETAILED DESCRIPTION OF THE INVENTION

As mentioned above, it is an object of the present invention to provide a quick and simple method to extract information from structured documents in general, and HTML documents in particular. Operation of systems and methods according to the invention are based on the following two assumptions. First, it may be assumed that it is desired to extract a subset of the data contained in each retrieved document. Second, it may be assumed that the input documents follow a small number, relative to the total number of input documents, of structures or templates.

Based on these assumptions, steps that may be included in the invention are as follows: aligning each document with respect to the other documents (alignment between a pair of documents A and B preferably obtains a measure of overall similarity between the structures of A and B by determining for each element in document A the location and relationship to the corresponding element in document B), clustering the documents according to their respective structures (it may be noted that, typically, documents are clustered according to their respective content, and not according to their respective structures), identifying the desired elements in the clusters' centroids, aligning each cluster's members to the centroids, and extracting desired information from substantially all the clustered documents. Each of these steps will be explained in more detail below with respect to FIGS. 1-12.

In addition, systems and methods according to the invention are able to quickly and easily adapt to changes to websites that occur either through the addition of new pages and/or changes to existing pages. By periodically clustering the pages in a website, any significant structural changes to pages, or the addition of new pages, are preferably detected and cause the changed page or new page to be shifted to the appropriate cluster. Thereafter, the information may be extracted from the changed page or new page.

It should be noted that the process of data element identification in the centroid can be done either manually or automatically as will be explained in more detail below with respect to FIGS. 8 and 9.

Figure 1:
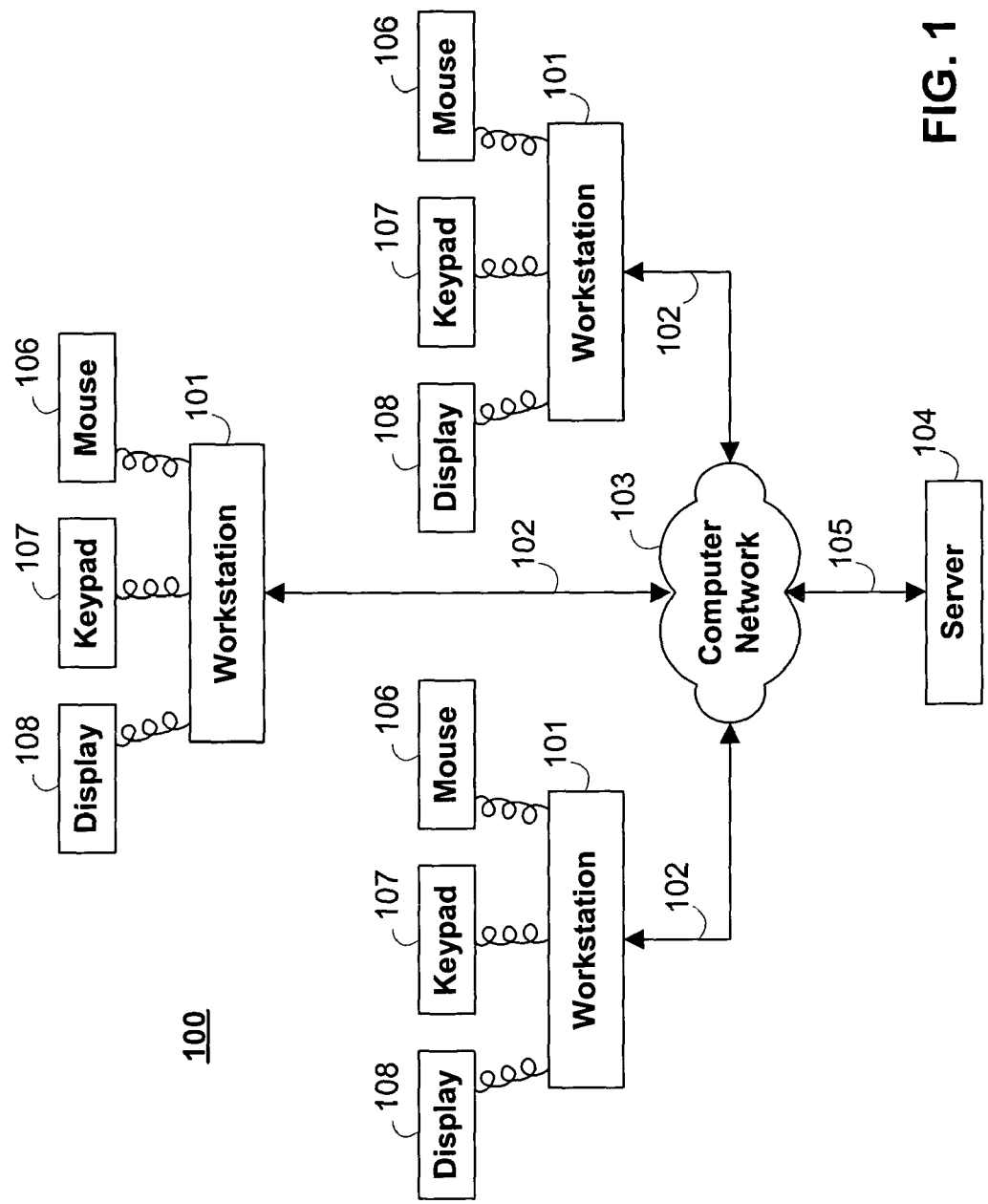
FIG. 1 is an illustration of an electronic implementation of a software system according to the present invention.

Referring to FIG. 1, exemplary data extraction system 100 for implementing the present invention is shown. As illustrated, system 100 may include one or more workstations 101. Workstations 101 may be local or remote, and are connected by one or more communications links 102 to computer network 103 that is linked via communications links 105 to server 104.

In system 100, server 104 may be any suitable server, processor, computer, or data processing device, or combination of the same. Server 104 may form part of the data extraction system. Furthermore, server 104 may also contain the data extraction system and merely transmit a Graphical User Interface or other display screens to the user at user workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 102 may be used to implement the electronic shopping system according to the invention.

Figure 2:
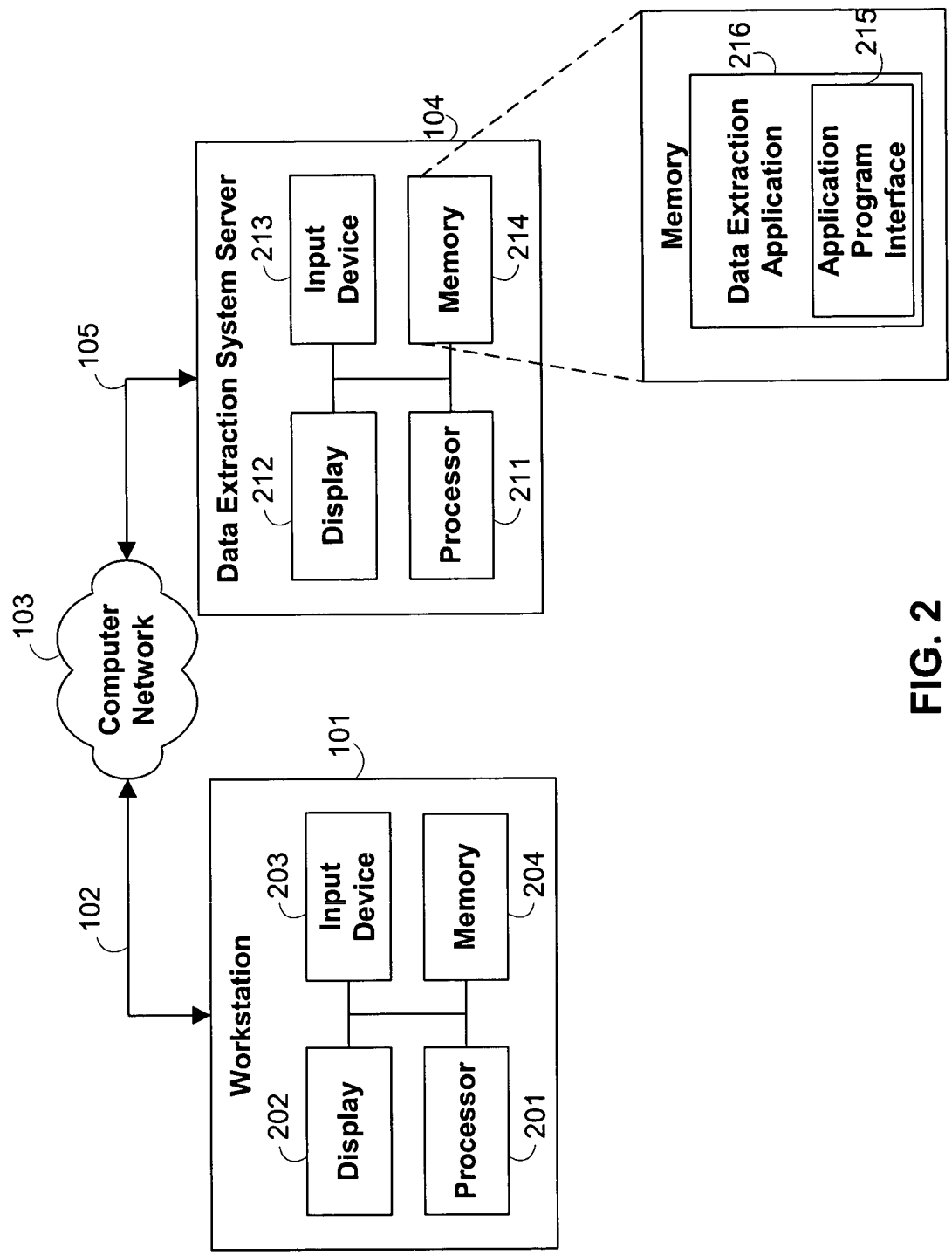
FIG. 2 is a block diagram of a workstation and a server that may be used to implement the processes and functions of certain embodiments of the present invention.

The server and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Memory 204 also preferably contains a data extraction application 216 according to the invention.

Data extraction application 216 may preferably include application program interface 215, or alternatively, as described above (and as shown in FIG. 2), data extraction application 216 may be resident in the memory of server 104. The only distribution to the user may be a Graphical User Interface which allows the user to interact with data extraction application 216 resident at server 104.

Processor 201 uses the workstation program to present on display 202 information relating to merchant websites or other data extraction conditions received through communication link 102 and commands, queries and navigational instructions or other suitable information transmitted by a user of workstation 101. Furthermore, input device 203 may be used to manually enter commands, queries and navigational instructions in order for these commands, queries and navigational instructions to guide the user through the data extraction system.

Figure 3:
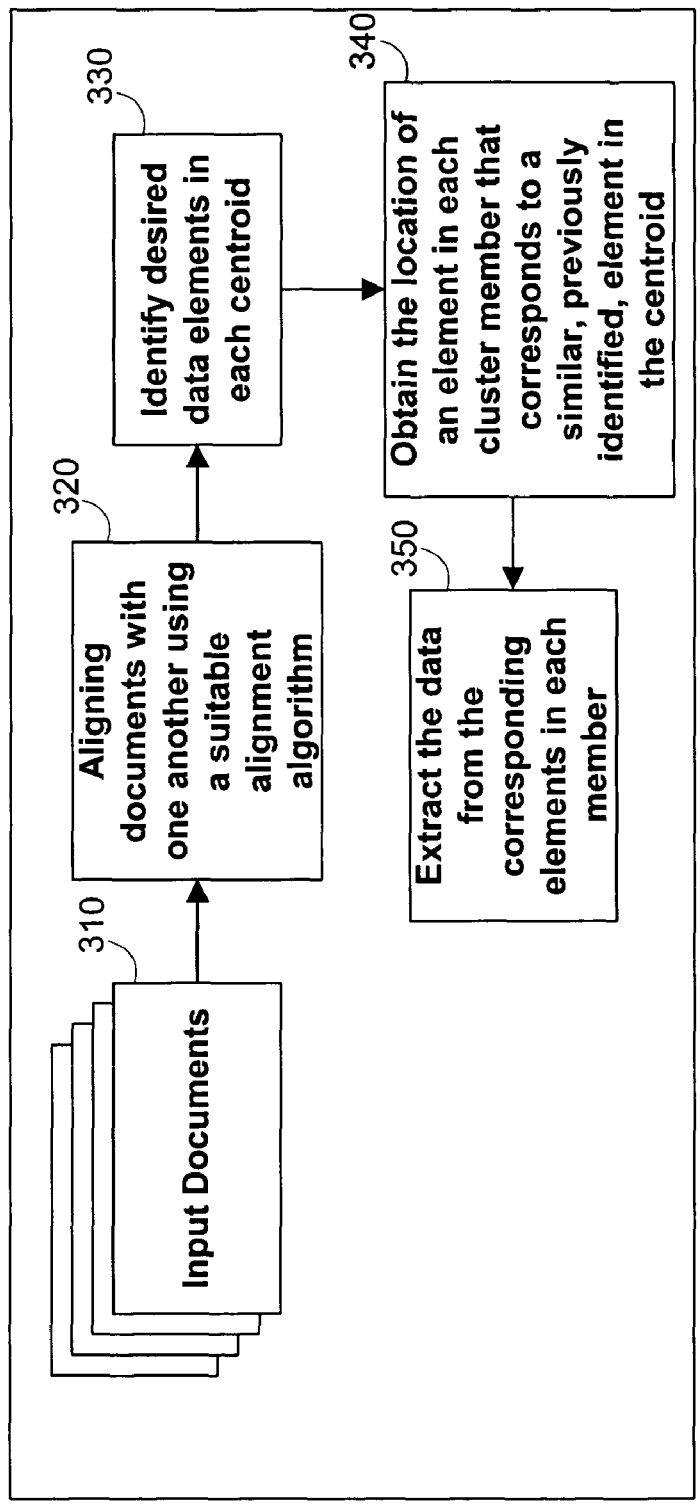
FIG. 3 is a flow chart of a method in accordance with the present invention.

FIG. 3 shows a flowchart of an overview of a method according to the invention. First, a number of input documents are collected 310. Then, the documents are aligned with one another to determine the respective similarity between each pair of documents 320. When the respective similarity between each of the documents is determined, the documents may be broken into clusters about pre-determined, or arbitrarily-selected, centroids 330. Thereafter, desired data elements in each centroid are identified 340. The identification step can be performed either manually or automatically—e.g., by a computer.

It should be noted that alignment step 320 also preferably identifies the location of an element in the cluster member that corresponds to a similar element in the centroid such that, when an element in the centroid is identified, the location of a corresponding element in each cluster member is also preferably identified as well.

Once the desired data elements in each centroid have been identified, the corresponding elements of the other members of the cluster are identified 350. Then the data from the matching elements in each member is extracted 360. It should be noted that the clustering obtained by the alignment in step 320 may preferably be used to determine the location of the corresponding data elements in each of the clusters step 350. Nevertheless, step 350 may be useful from an implementation standpoint. Once the data from the matching elements has been extracted in a predetermined fashion, the data can be used by a suitable content aggregator to provide results to particular queries or in any other suitable fashion.

Figure 4:
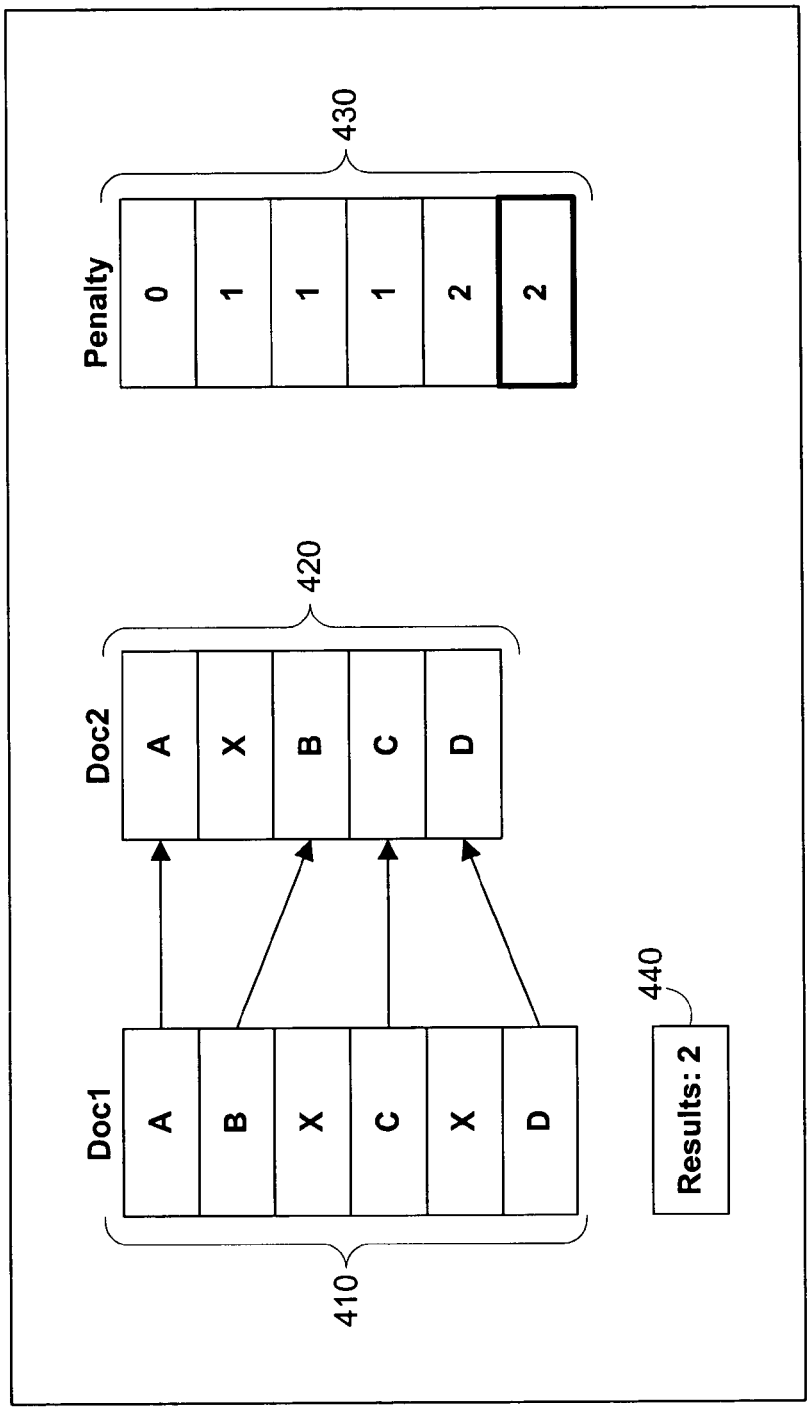
FIG. 4 is a comparison of two documents using an alignment algorithm.

FIG. 4 shows a comparison of two documents. Table 410 represents a group of elements within a first member. Table 420 represents a group of elements within a second member. Table 430 represents the penalty associated with dissimilarities between member 1 and member 2. Result 440 shows the tabulation of the total dissimilarity between the two members. Result 440 may be used to determine whether a first member is sufficiently close to a second member to be considered as part of a cluster having the second member as the centroid.

Furthermore, the comparison between the two documents establishes a correlation between the location of each of the elements in the first group and the location of the corresponding or matching elements in the second group. Thus, the location of each of the elements in the second group is readily obtainable from the location of each of the elements in the first group, or vice versa.

Alignment algorithms for providing such a comparison are discussed in depth in M. Crochemore and W. Rytter. *Text Algorithms.* Oxford University Press, New York, 1994, — G. A. Stephen. *String Searching Algorithms* Lecture-Notes-Series-on-Computing, World-Scientific-Publishing, October 1994, and D. Gusfield. String Algorithms. Cambridge University Press, 1997, each of which are incorporated by reference herein in their respective entireties. Such alignment algorithms are typically classified as Approximate String Matching algorithms.

A suitable one of these algorithms, or other algorithm, may be used to determine the relative similarity between each of the individual pages. This relative similarity is required to form the clusters. In addition, a suitable one of these algorithms may be used to determine whether the cluster member is within a predetermined threshold distance from a centroid. The threshold may be set such that any member of any cluster will be within a particular distance of the centroid and, therefore, will be an appropriate candidate for data extraction based on the data element identification of the centroid.

In the event that the comparison to a centroid is faulty—e.g., that the elements obtained in the corresponding members do not accurately reflect the marked data elements in the centroid—then a new centroid may be chosen. Alternative to the change of the centroid, automated identification and elimination of outlying cluster members that do not map sufficiently with the cluster centroid, but are still within the threshold, is also possible.

As described above, in one embodiment of the invention these two steps of aligning about a cluster and determining the corresponding elements in the cluster members may be combined. In such embodiments, a centroid is chosen and then the cluster about the centroid is preferably filled only with the members that are within the threshold. Then, the data extraction can begin for the members of the cluster without requiring additional aligning. Thereafter, a new centroid can be selected for the members who were not within the distance threshold for the first centroid and a new cluster can preferably be formed.

The following algorithm is an example of one embodiment of a clustering algorithm that may be used according to the invention. Other clustering algorithms may also be suitable for use in systems and methods according to the invention.

1. for each document doc do
2. $min\Delta$=infinite
3. for each centroid c in the clusters
4. $\Delta$=doc compared with c
5. if $\Delta$ is less than mint then $min\Delta$=$\Delta$
6. next
7. if $min\Delta$ is less than the threshold then
8. add doc to the cluster that produced $min\Delta$
9. else
10. create a new cluster and let doc be its centroid
11. end if
12. next Line 1 of the algorithm starts iteration through all the input documents. Line 2 initializes a variable that will set the distance to the most similar centroid to infinity. Line 3 starts iteration through all the cluster centroids created so far. In line 4, the document is compared to the first centroid in the iterative process. The comparison can be done by aligning the documents as described in FIG. 4 and the portion of the specification corresponding thereto. Line 5 determines whether the presently selected centroid is most similar to the selected document. Line 6 shifts to the next centroid. Line 7-8 shows adding the document to the cluster associated with the nearest centroid. The threshold in line 7 may either be input by an operator or automatically determined. The threshold should preferably be set to limit the cluster to documents having data that, when extracted, are sufficiently similar to the data of the centroid. Such a selection of the threshold will preferably produce useful data. Lines 9-10 show the creation of a new cluster.

Figure 5:
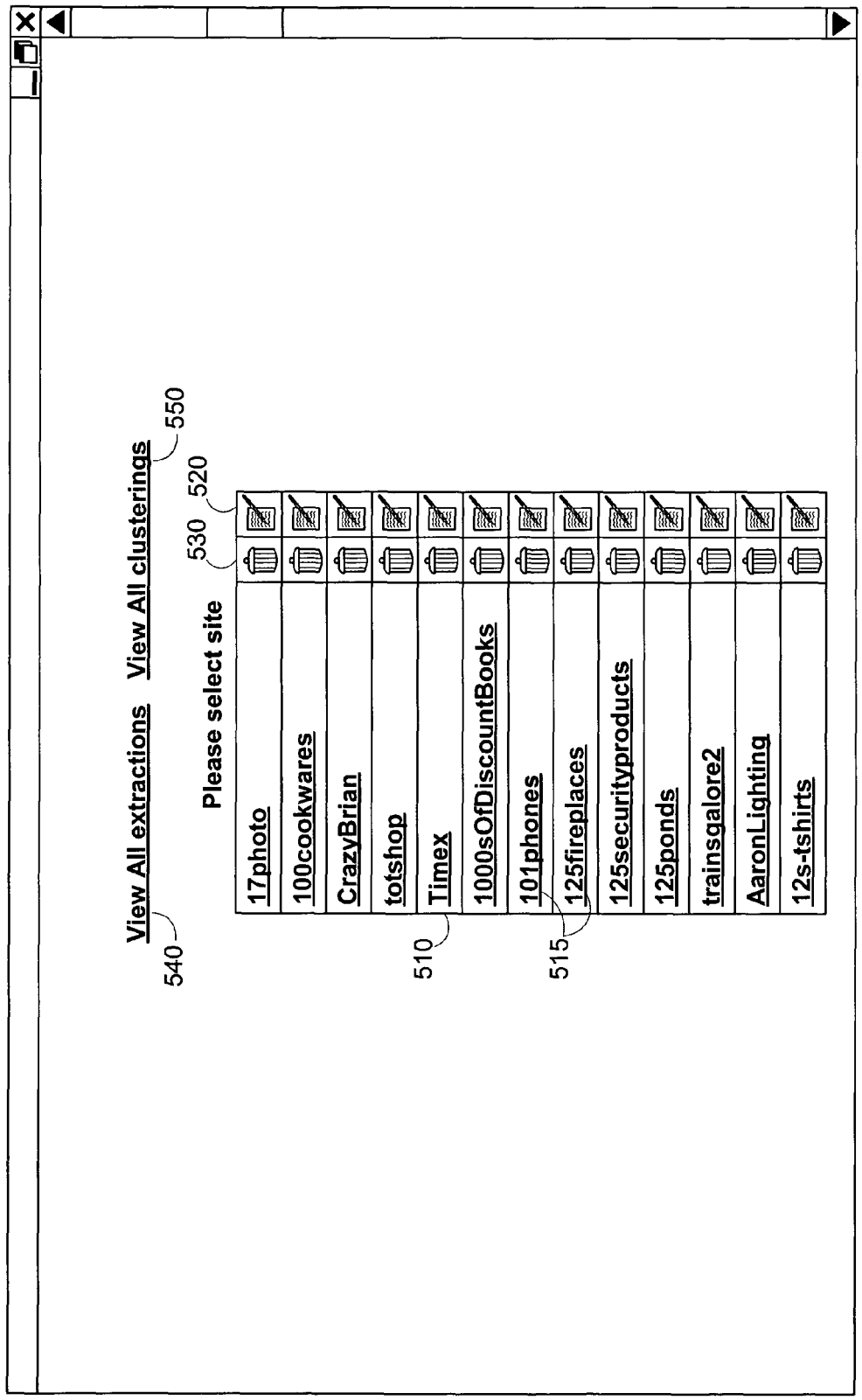
FIG. 5 is a home page for a data extraction site.

FIG. 5 shows one embodiment of a home page associated with systems and methods according to the invention. The home page preferably includes a listing 510 of web sites 515 that may include multiple web pages. Corresponding to each of the listing of web sites are two icons. Extraction icon 520 is preferably for allowing a user to select the website for performing data extraction according to the invention. Garbage icon 530 may preferably be for removing the associated web site from the home page. The home page may also include options to view all extractions 540 and view all clusterings 550 that were previously performed on selected web sites.

Figure 6:
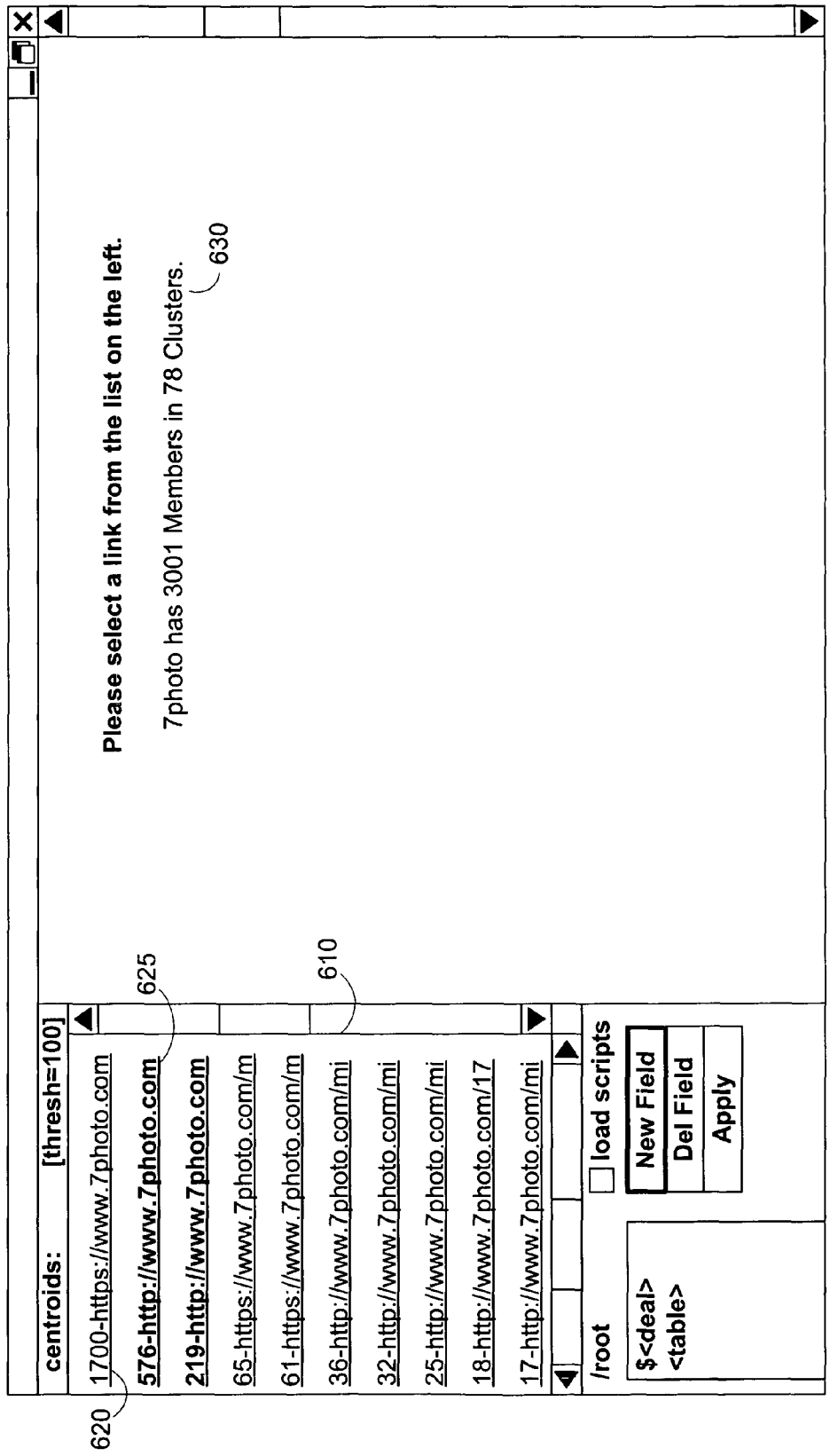
FIG. 6 is a list of clusters for a selected merchant web site.

FIG. 6 shows a list of clusters 610 identified by their centroids—i.e., the web page that is at the center of the cluster—after the website "17 Photo" has been selected for data extraction. Each individual listing in cluster listing 610 preferably includes a number 620 which represents the number of pages associated with the listing, and the URL 625 of the centroid. FIG. 6 also includes a statistics indicator 630 which compiles the statistics for the web site.

Figure 7:
FIG. 7 is an example of a non-product cluster centroid.

FIG. 7 shows a sample centroid. The centroid is a page 710 from a non-product cluster. Page 710 does not include any product information. Rather, it is a registration form that may be filled out by a customer. The nature of the page can be determined either by a human operator or by a suitable subroutine. Such a subroutine may determine whether the page is a product page by identifying certain codes in the page that are typically associated with product pages. These codes may be associated with a price, description, title or component suitable component of a product cluster. These codes may be in HTML or some other suitable language such as XML and XSL.

Figure 8:
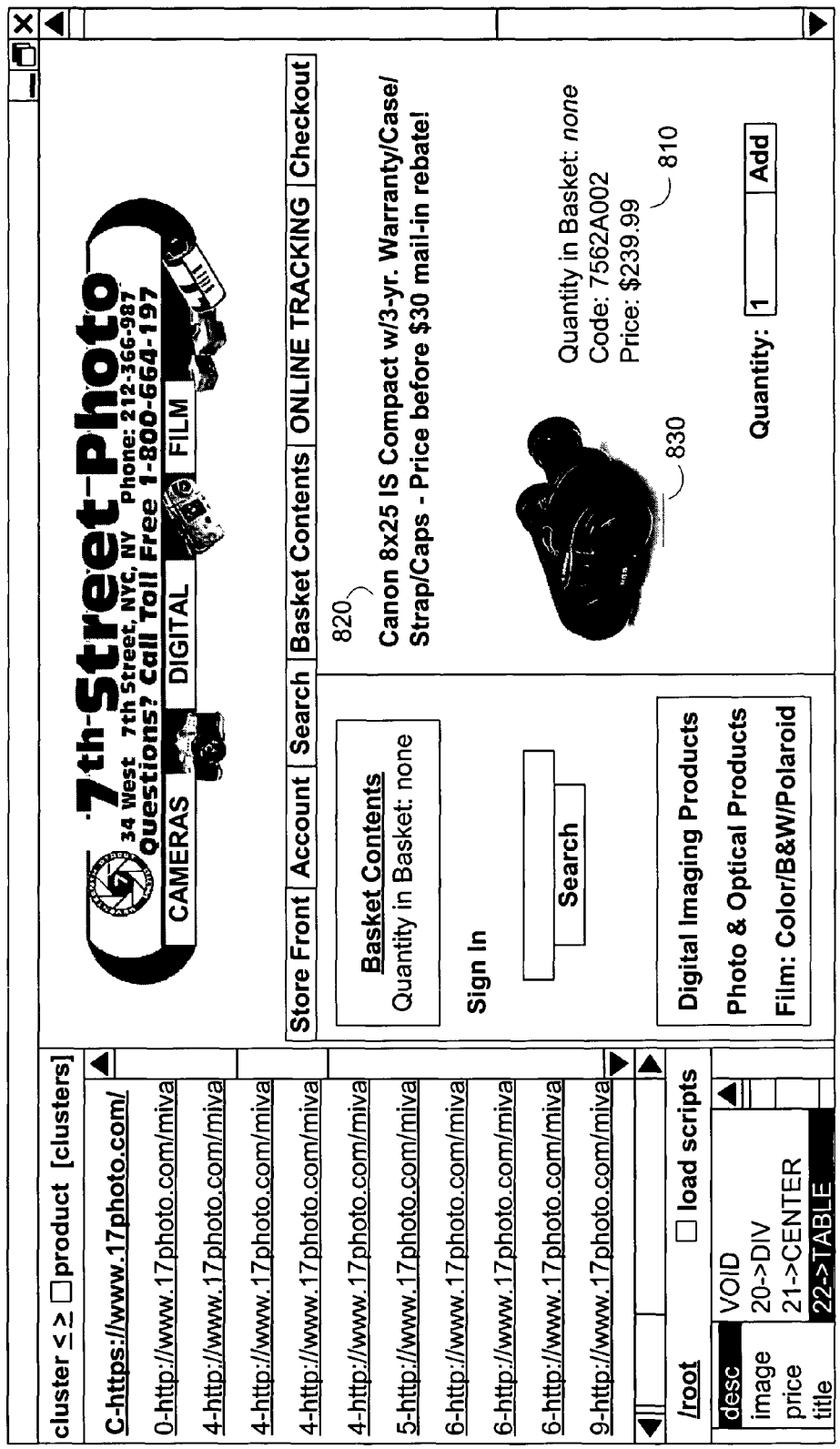
FIG. 8 is an example of a product cluster centroid.

FIG. 8 shows a sample centroid from a product cluster. The price 810, description (not shown), title 820 and image 830 all may be tagged (or alternatively, "marked" which, for the purposes of this application is to be understood to have the same meaning as "tagged") by a human operator and/or a computer.

Figure 9:
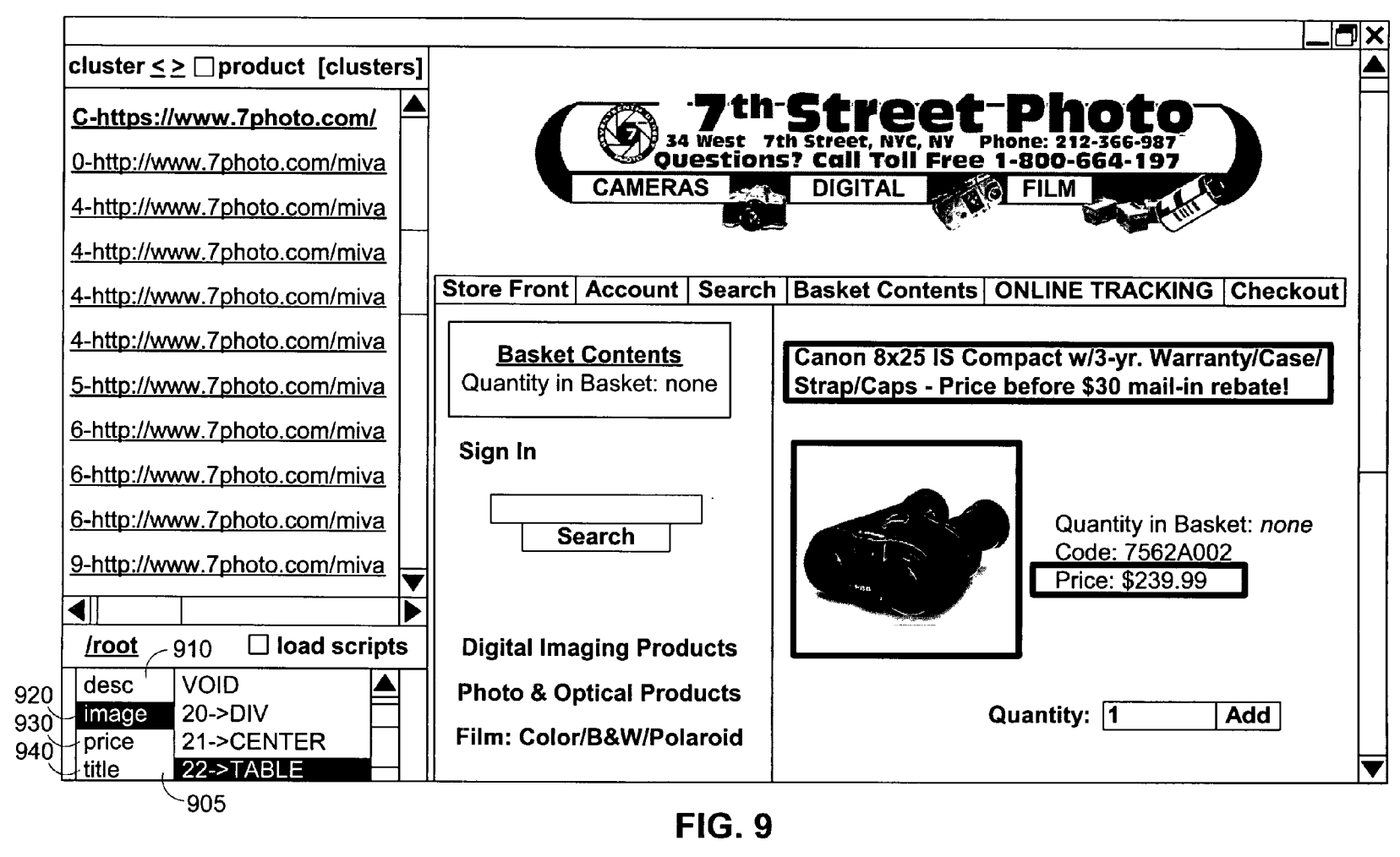

FIG. 9 shows the sample centroid of FIG. 8 following tagging. Tagging may be implemented using tag selection box 905. Tag selection box allows a human operator to click on any one of the tags assigned to description 910, image 920, price 930, title 940 or any other suitable selection. Following the section of the tag the operator may then select a corresponding portion of the centroid whereby the selected portion of the centroid is associated with the selected tag (which is indicated in FIG. 9 by a thick, black outline around the tagged item). This selection may then be applied to all the members of the cluster associated with the centroid. In this manner, a vast number of web pages can be quickly and easily adapted for data extraction.

Figure 10:
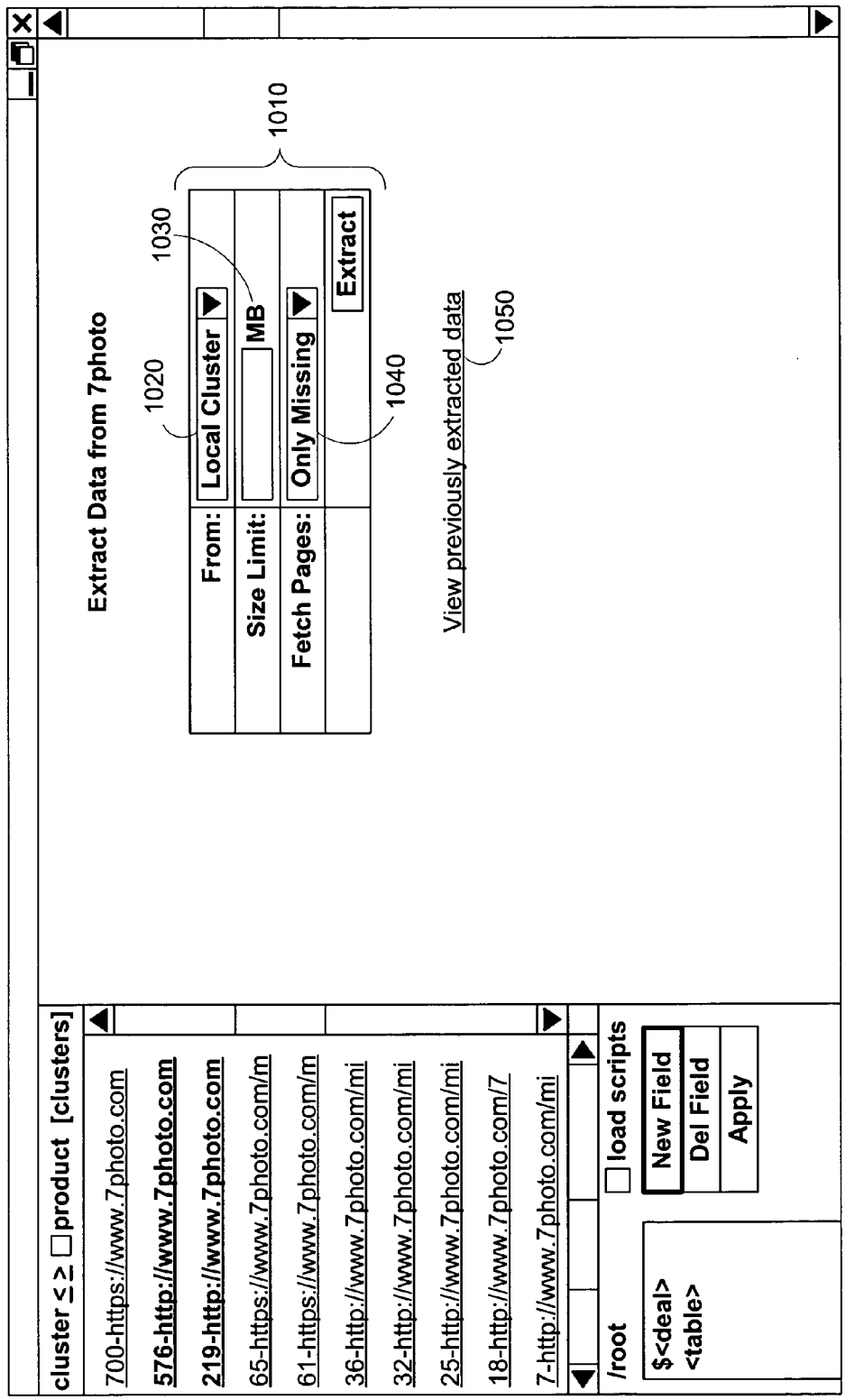
FIG. 10 is an example of a data extraction menu.

FIG. 10 shows an extraction menu 1010. This menu provides a human operator the ability to guide the extraction based on target cluster 1020, size limit 1030, selected pages 1040 or any other suitable criteria. This menu also includes an option to view previously extracted data 1050.

FIG. 11 shows a sample of extracted data from a cluster. The listing of extracted data may include, for example, the url (Uniform Resource Locator) 1110 of the product, the title 1120, the description 1130, the image 1140, and the price 1150.

FIG. 12 shows a similar sample of extracted data. In FIG. 12, the data 1210, which includes multiple listings, relates to cookware. Each of FIGS. 11 and 12 clearly indicate the accuracy and clarity of format with which the associated data may be extracted from a web site including large numbers of web pages. In another embodiment of the invention, extracted data, such as the data displayed in FIGS. 11 and 12, may be adapted to, and displayed in, spreadsheet format for further, and more efficient, utilization of the extracted data.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A computer-implemented method of extracting information from co-occurring Hyper Text Mark-up Language (HTML) structured documents, the method comprising:
   presenting a list of web sites to a user;
   receiving one or more of the web sites selected from the user for data extraction;
   collecting a plurality of co-occurring different HTML structured documents for each of the selected web sites at a computer comprising a processor;
   forming a plurality of clusters comprising different subsets of the co-occurring HTML structured documents, wherein:
      each cluster comprises a different HTML structured document of the plurality of co-occurring HTML structured documents as a centroid document and other HTML structured documents of the plurality of co-occurring HTML structured documents that achieve a threshold of similarity with respect to the centroid document,
      the clusters are formed by comparing each co-occurring HTML structured document to each centroid document of each cluster based on relative structural similarity of HTML data structure of each co-occurring HTML structured document with respect to HTML data structure of each centroid document of each cluster,
      an alignment algorithm is used to determine the co-occurring HTML structured documents that achieve the threshold of similarity with respect to each centroid document by comparing structured locations of data fields for storing data elements within each centroid document and structured locations of corresponding data fields for storing data elements within each of the co-occurring HTML structured documents, the co-occurring HTML structured documents are compared to each centroid document based on similarity of structured locations of corresponding data fields within the HTML data structures without regard to content of data elements stored in the corresponding data fields within the HTML data structures, and
      the relative structural similarity of a particular co-occurring HTML structured document with respect to a particular centroid document is penalized when the co-occurring HTML structured document includes a data field that is within the particular centroid document in a different structured location;
   displaying a list of clusters;
   displaying the centroid document of a particular cluster selected from the list of clusters;
   marking a data element on the centroid document of the particular cluster;
   identifying a data element on each of the other HTML structured documents of the particular cluster that is stored within a data field having a structured location that corresponds to the structured location of the data field storing the marked data element within the centroid document of the particular cluster; and
   providing a user interface displaying content of data elements identified from the other HTML structured documents of the particular cluster on a computer display.

2. The method of claim 1, further comprising collecting a plurality of HTML structured documents from a merchant web site.

3. The method of claim 1, further comprising displaying a listing of web sites that include clusters of HTML structured documents.

4. The method of claim 1, further comprising automatically marking the data element on the centroid document of the particular cluster.

5. The method of claim 1, where in the threshold is predetermined.

6. The method of claim 1, wherein the threshold is automatically generated.

7. The method of claim 1, further comprising extracting data from the HTML structured document that is the centroid document of the particular cluster based on the marked data element of the centroid document of the particular cluster.

8. The method of claim 1, further comprising extracting data from the other HTML structured documents of the particular cluster based on the identified data element on each of the other HTML structured documents of the particular cluster.

9. The method of claim 8, further comprising formatting the extracted data in a table.

10. The method of claim 8, further comprising formatting the extracted data in a spreadsheet format.

11. The method of claim 1, further comprising:
   receiving a new HTML structured document;
   selecting the most similar centroid document to the new HTML structured document based on the relative structural similarity of HTML data structure of the new HTML structured document and HTML data structure of each centroid document of each cluster;
   adding the new HTML structured document to the cluster that includes the selected centroid document if the new HTML structured document achieves a threshold of similarity with respect to the selected centroid document;
   marking a data element on the selected centroid document; and identifying a data element on the new HTML structured document that corresponds to the marked data element on the selected centroid document.

12. The method of claim 1, further comprising using an alignment algorithm to extract the data element identified on each of the other HTML structured documents that corresponds to the marked data element on the centroid document of the particular cluster.

13. An apparatus for implementing a data extraction process, the apparatus comprising a workstation storage device, a workstation processor connected to the workstation storage device, the workstation storage device storing a workstation program for controlling the workstation processor, and the workstation processor operative with the workstation program to:

present a list of web sites to a user;
receive one or more of the web sites selected from the user for data extraction;
form a plurality of clusters comprising different subsets of a group of co-occurring Hyper Text Mark-up Language (HTML) structured documents for each of the selected web sites, wherein: each cluster comprises a different HTML structured document of the group of co-occurring HTML structured documents as a centroid document and other HTML structured documents of the group of co-occurring HTML structured documents that achieve a threshold of similarity with respect to the centroid document,
the clusters are formed by comparing each co-occurring HTML structured document to each centroid document of each cluster based on relative structural similarity of HTML data structure of each co-occurring HTML structured document with respect to HTML data structure of each centroid document of each cluster,
an alignment algorithm is used to determine the co-occurring HTML structured documents that achieve the threshold of similarity with respect to each centroid document by comparing structured locations of data fields for storing data elements within each centroid document and structured locations of corresponding data fields for storing data elements within each of the co-occurring HTML structured documents, the co-occurring HTML structured documents are compared to each centroid document based on similarity of structured locations of corresponding data fields within the HTML data structures without regard to content of data elements stored in the corresponding data fields within the HTML data structures, and
the relative structural similarity of a particular co-occurring HTML structured document with respect to a particular centroid document is penalized when the co-occurring HTML structured document includes a data field that is within the particular centroid document in a different structured location;
display a list of clusters;
display the centroid document of a particular cluster selected from the list of clusters;
mark a data element on the centroid document of the particular cluster;
identify a data element on each of the other HTML structured documents of the particular cluster that is stored within a data field having a structured location that corresponds to the structured location of the data field storing the marked data element within the centroid document of the particular cluster; and provide a user interface displaying content of data elements identified from the other HTML structured documents of the particular cluster on a computer display.

14. The apparatus of claim 13, further configured to collect a plurality of HTML structured documents from a merchant web site.

15. The apparatus of claim 13, further configured to display a plurality of web sites that include clusters of HTML structured documents.

16. The apparatus of claim 13, further configured to automatically mark the data element on the centroid document of the particular cluster.

17. The apparatus of claim 13, further configured to determine the co-occurring HTML structured documents that achieve a pre-determined threshold.

18. The apparatus of claim 13, further configured to determine the co-occurring HTML structured documents that achieve an automatically-generated threshold.

19. The apparatus of claim 13, further configured to extract data from the HTML structured document that is the centroid document of the particular cluster based on the marked data element of the centroid document of the particular cluster.

20. The apparatus of claim 13, further configured to extract data from the other HTML structured documents of the particular cluster based on the identified data element on each of the other HTML structured documents of the particular cluster.

21. The apparatus of claim 20, further configured to format the extracted data in a table.

22. The apparatus of claim 20, further configured to format the extracted data in a spreadsheet format.

23. An apparatus for implementing a data extraction process, the apparatus comprising a workstation storage device, a workstation processor connected to the workstation storage device, the workstation storage device storing a workstation program for controlling the workstation processor, and the workstation processor operative with the workstation program to:

present a list of web sites to a user;
receive one or more of the web sites selected from the user for data extraction;
form a plurality of clusters comprising different subsets of a group of co-occurring Hyper Text Mark-up Language (HTML) structured documents for each of the selected web sites, wherein each cluster comprises a different HTML structured document of the group of co-occurring HTML structured documents as a centroid document and other HTML structured documents of the group of co-occurring HTML structured documents that achieve a threshold of similarity with respect to the centroid document;
select a first centroid document from a first cluster of the plurality of clusters;
select an HTML structured document from the group of co-occurring HTML structured documents that is not included in the first cluster;
compare the selected HTML structured document to the first centroid document based on relative structural similarity of HTML data structure of the selected HTML structured document with respect to HTML data structure of the first centroid document, wherein:
an alignment algorithm is used to determine whether the selected HTML structured document achieves a threshold of similarity with respect to the first centroid document by comparing structured locations of data fields for storing data elements within the first centroid document and structured locations of corresponding data fields for storing data elements within the selected HTML structured document, the selected HTML structured document is compared to the first centroid document based on similarity of structured locations of corresponding data fields within the HTML data structures without regard to content of data elements stored in the corresponding data fields within the HTML data structures, and the relative structural similarity of the selected HTML structured document with respect to the first centroid document is penalized when the selected HTML structured document includes a data field that is within the first centroid document in a different structured location;

add the selected HTML structured document to the first cluster if the selected HTML structured document achieves the threshold of similarity with respect to the first centroid document;

display a list of clusters;

display the first centroid document in response to selection of the first cluster from the list of clusters;

mark a data element on the first centroid document;

correlate the marked data element in the first centroid document with a corresponding data element in each of the other HTML structured documents of the first cluster when the corresponding data element is stored within a data field having a structured location that corresponds to the structured location of the data field storing the marked data element within the first centroid document;

extract the corresponding data element in each of the other HTML structured documents of the first cluster; and provide a user interface displaying content of the corresponding data element of each of the other HTML structured documents of the first cluster on a computer display.

24. A computer-readable storage medium storing a computer program comprising instructions that, when executed, cause a computer to perform a computer-implemented method of extracting information from co-occurring Hyper Text Mark-up Language (HTML) structured documents, the method comprising:

presenting a list of web sites to a user;

receiving one or more of the web sites selected from the user for data extraction;

collecting a plurality of co-occurring different HTML structured documents for each of the selected web sites at the computer;

forming a plurality of clusters comprising different subsets of the co-occurring HTML structured documents, wherein:

each cluster comprises a different HTML structured document of the plurality of co-occurring HTML structured documents as a centroid document and other HTML structured documents of the plurality of co-occurring HTML structured documents that achieve a threshold of similarity with respect to the centroid document, the clusters are formed by comparing each co-occurring HTML structured document to each centroid document of each cluster based on relative structural similarity of HTML data structure of each co-occurring HTML structured document with respect to HTML data structure of each centroid document of each cluster, an alignment algorithm is used to determine the co-occurring HTML structured documents that achieve the threshold of similarity with respect to each centroid document by comparing structured locations of data fields for storing data elements within each centroid document and structured locations of corresponding data fields for storing data elements within each of the co-occurring HTML structured documents, the co-occurring HTML structured documents are compared to each centroid document based on similarity of structured locations of corresponding data fields within the HTML data structures without regard to content of data elements stored in the corresponding data fields within the HTML data structures, and the relative structural similarity of a particular co-occurring HTML structured document with respect to a particular centroid document is penalized when the co-occurring HTML structured document includes a data field that is within the centroid document in a different structured location;

displaying a list of clusters;

displaying the centroid document of a particular cluster selected from the list of clusters;

marking a data element on the centroid document of the particular cluster;

identifying a data element on each of the other HTML structured documents of the particular cluster that is stored within a data field having a structured location that corresponds to the structured location of the data field storing the marked data element within the centroid document of the particular cluster; and providing a user interface displaying content of data elements identified from the other HTML structured documents of the particular cluster on a computer display.

25. A computer-implemented method of extracting information from co-occurring Hyper Text Mark-up Language (HTML) structured documents, the method comprising:

presenting a list of web sites to a user;

receiving one or more of the web sites selected from the user for data extraction;

forming a plurality of clusters comprising different subsets of a group of co-occurring Hyper Text Mark-up Language (HTML) structured documents for each of the selected web sites, wherein each cluster comprises a different HTML structured document of the group of co-occurring HTML structured documents as a centroid document and other HTML structured documents of the group of co-occurring HTML structured documents that achieve a threshold of similarity with respect to the centroid document;

selecting a first centroid document from a first cluster of the plurality of clusters;

selecting an HTML structured document from the group of co-occurring HTML structured documents that is not included in the first cluster;

comparing the selected HTML structured document to the first centroid document based on relative structural similarity of HTML data structure of the selected HTML structured document with respect to HTML data structure of the first centroid document, wherein:

an alignment algorithm is used to determine whether the selected HTML structured document achieves a threshold of similarity with respect to the first centroid document by comparing structured locations of data fields for storing data elements within the first centroid document and structured locations of corresponding data fields for storing data elements within the selected HTML structured document, the selected HTML structured document is compared to the first centroid document based on similarity of structured locations of corresponding data fields within the HTML data structures without regard to content of data elements stored in the corresponding data fields within the HTML data structures, and the relative structural similarity of the selected HTML structured document with respect to the first centroid document is penalized when the selected HTML structured document includes a data field that is within the first centroid document in a different structured location;

adding the selected HTML structured document to the first cluster if the selected HTML structured document achieves the threshold of similarity with respect to the first centroid document;

displaying a list of clusters;

displaying the first centroid document in response to selection of the first cluster from the list of clusters;

marking a data element on the first centroid document;

correlating the marked data element in the first centroid document with a corresponding data element in each of the other HTML structured documents of the first cluster when the corresponding data element is stored within a data field having a structured location that corresponds to the structured location of the data field storing the marked data element within the first centroid document;

extracting the corresponding data element in each of the other HTML structured documents of the first cluster; and providing a user interface displaying content of the corresponding data element of each of the other HTML structured documents of the first cluster on a computer display.

26. The method of claim 25, wherein the list of clusters comprises a uniform resource locator of each centroid document of each cluster and a number of HTML structured documents associated with each cluster.

27. The method of claim 1, wherein the list of clusters comprises a uniform resource locator of each centroid document of each cluster and a number of HTML structured documents associated with each cluster.

* * * * *